Patented Oct. 15, 1946

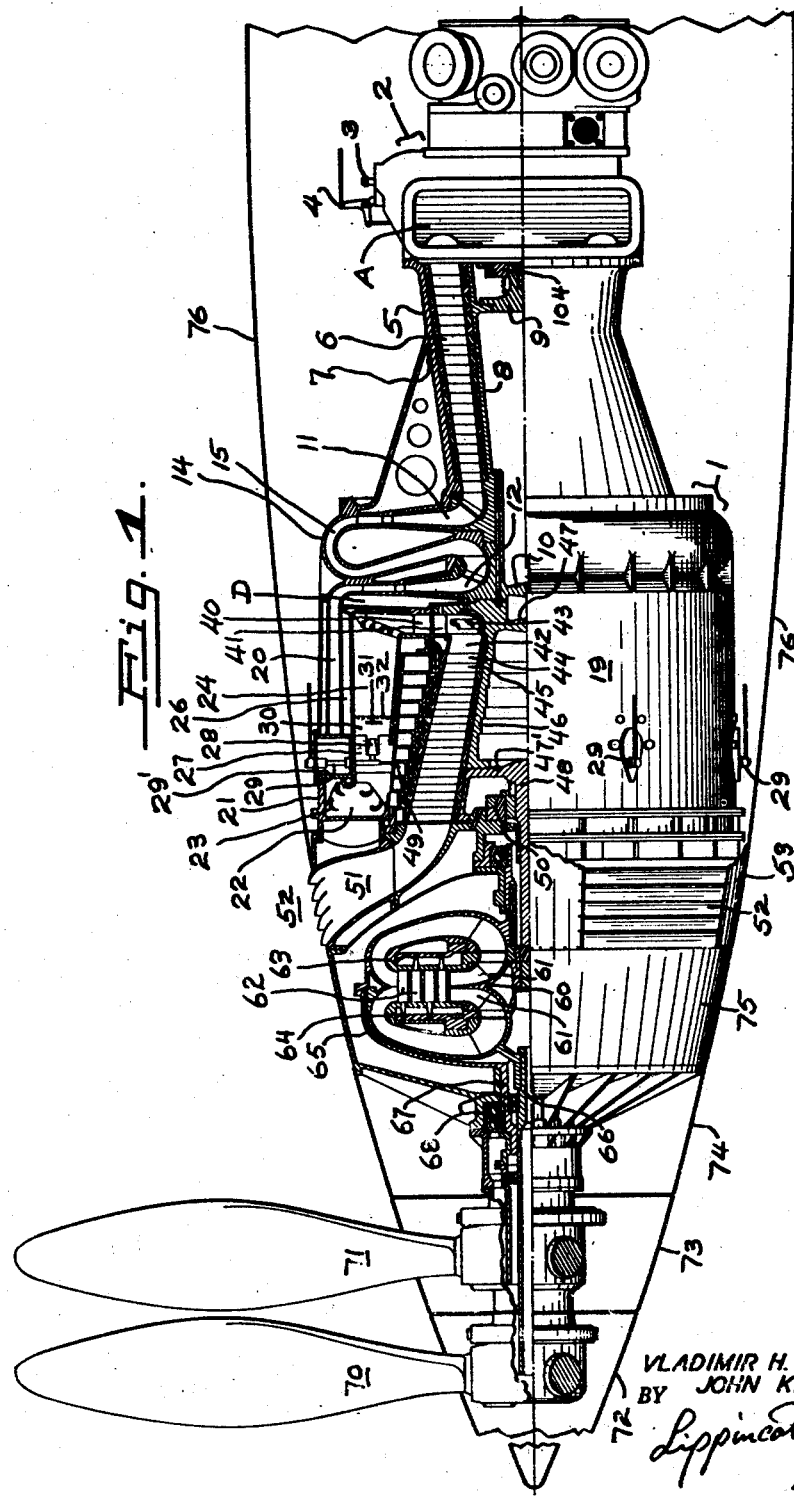

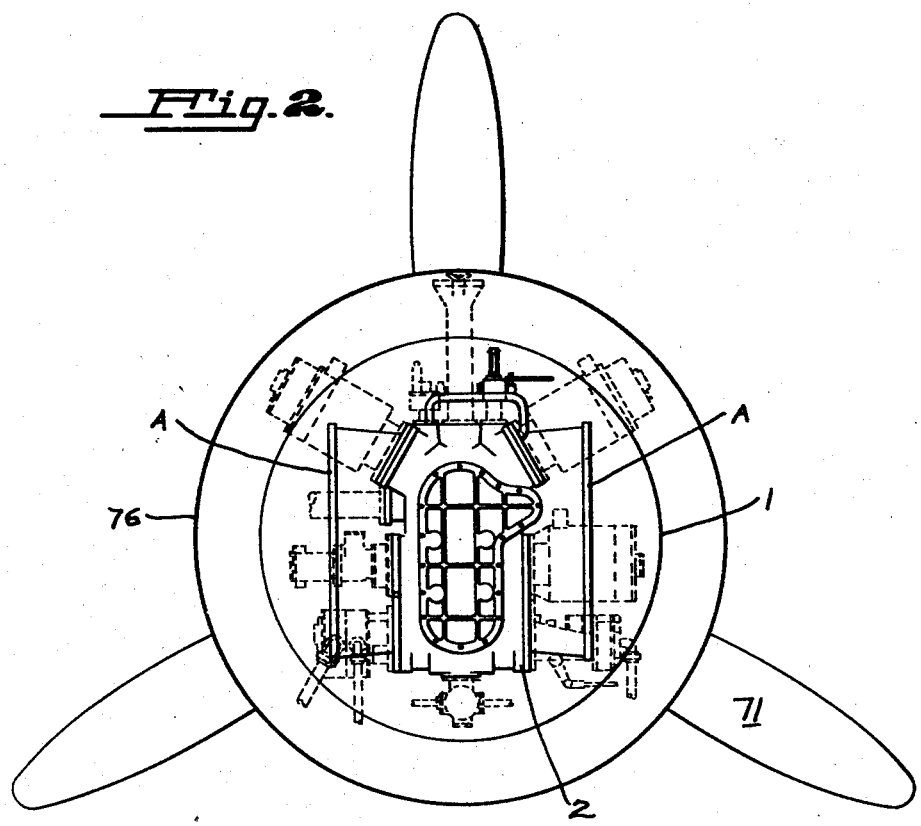
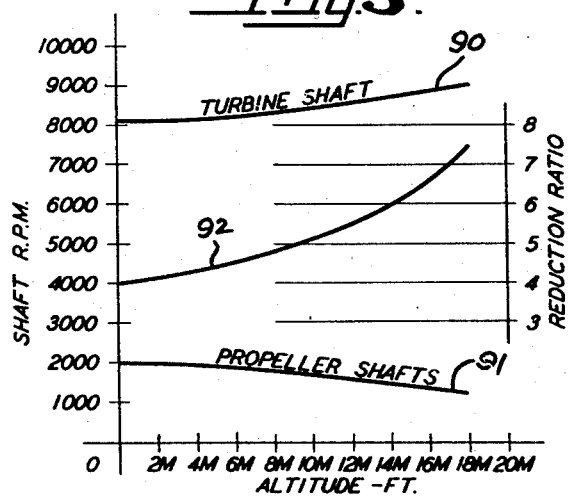
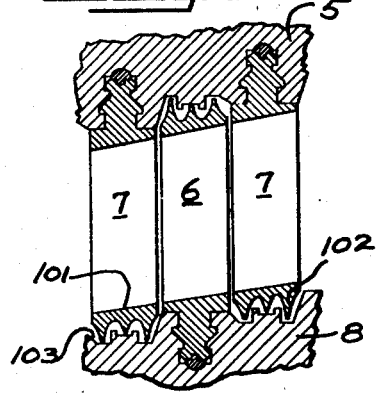

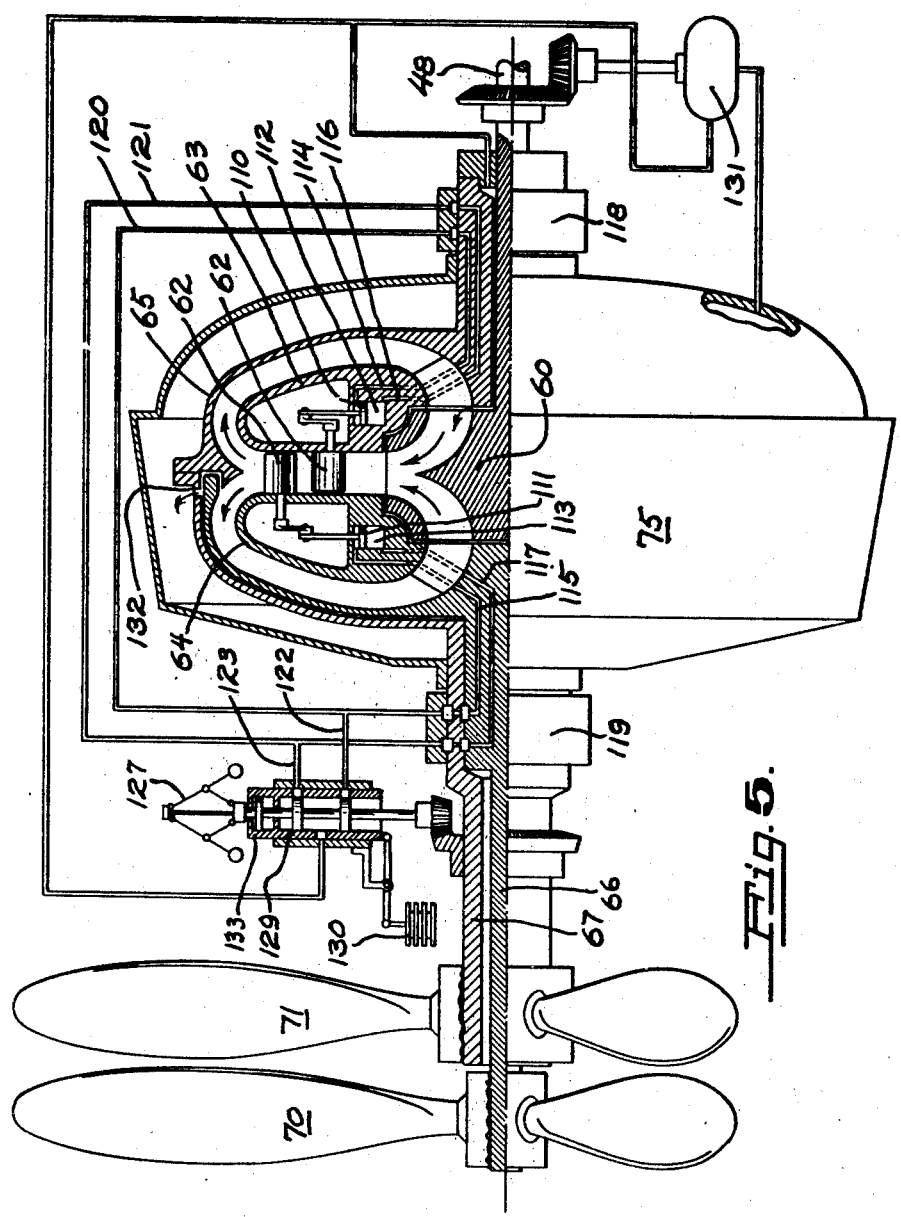

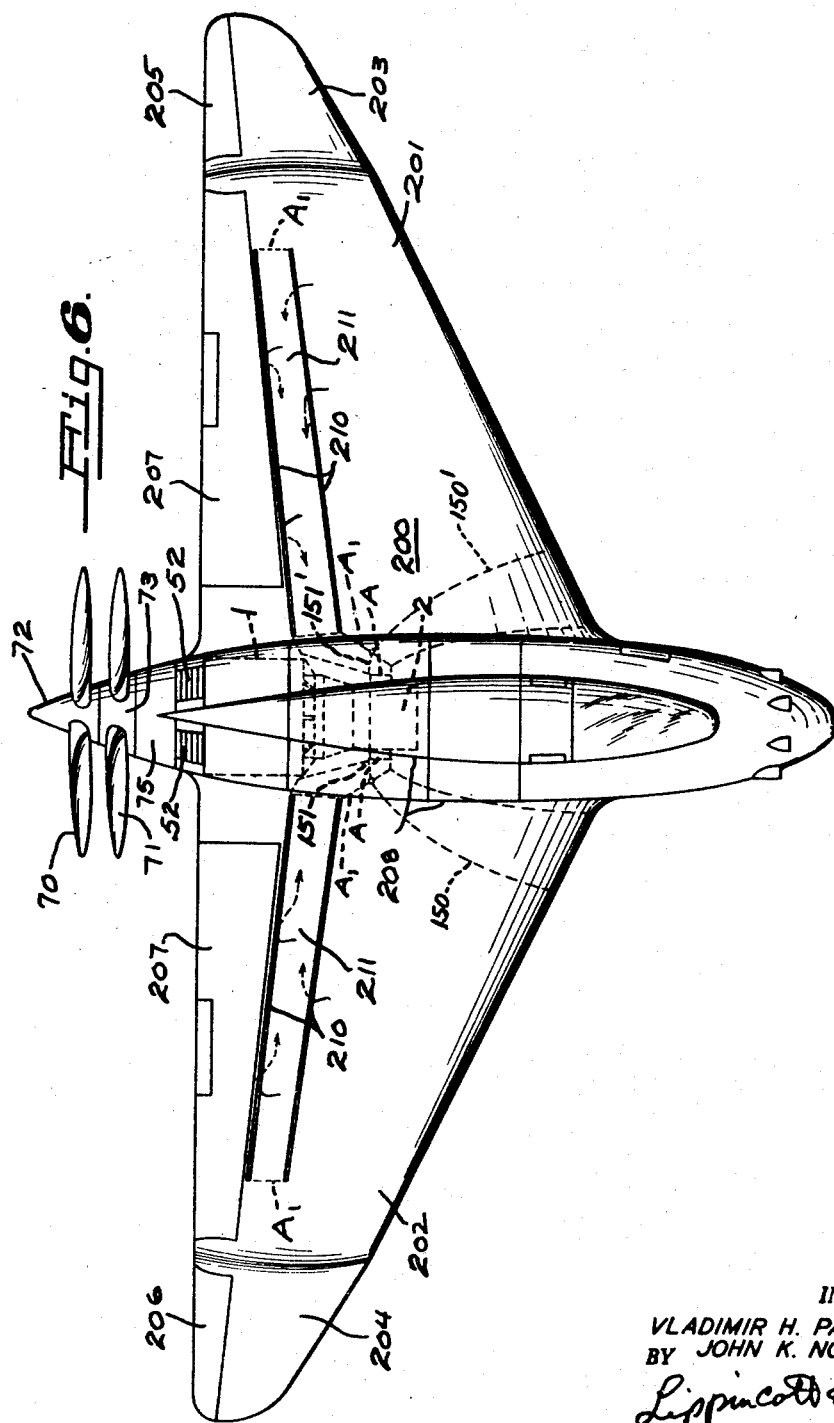

2,409,446

UNITED STATES PATENT OFFICE 2,409,446

AIRPLANE POWER PLANT

Vladimir H. Pavlecka, Pacific Palisades, and John K. Northrop, Los Angeles, Calif., assignors to Northrop Aircraft, Inc., Hawthorne, Calif., a corporation of California Application November 10, 1941, Serial No. 418,476

9 Claims. (Cl. 170—135.5)

This invention relates to a power plant of the continuous combustion type operating at substantially constant pressure, according to the Ericsson thermodynamic cycle, sometimes erroneously called the Brayton cycle. Although the theory of such turbines has long been known and some have been put into actual commercial operation as stationary power plants, relatively little has been so far accomplished in the development of gas turbine power plants for driving purposes in transportation, particularly for airplane propulsion.

The present invention deals with a gas turbine power plant specifically conceived for airplane propulsion use.

This application is a continuation-in-part of the following applications,

| Name | Ser. No. | Filing date | Title |
|---|---|---|---|
| Pavlecka-Northrop | 413,781 | Oct. 6, 1941 | Compressor. |
| Dallenbach-Northrop | 381,622 | Mar. 3, 1941 | Burner. |
| Pavlecka | 385,105 | Mar. 25, 1941 | Turbine-stator. |
| Pavlecka-Northrop | 403,338 | July 21, 1941 | Gas-turbine. |
| Pavlecka | 360,707 | Oct. 11, 1941 | Hydraulic torque converter. |

Application Serial No. 403,338 is now an abandoned application, while application Serial No. 381,622 has matured into Patent No. 2,296,023, dated September 15, 1942.

A gas turbine power plant becomes commercially attractive when its thermal efficiency reaches values comparable to the efficiency of existing reciprocating thermal power plants. It will be apparent to those familiar with thermodynamics that good thermal efficiencies in gas turbines can be obtained if either the maximum cycle temperature is increased, or the thermodynamic efficiencies of the turbo-machines improved or, preferably, if both are increased at the same time.

So far, gas turbine power plants have not come into wide use, partially because of difficulties with metals under stress at high temperatures of combustion gases, and also due to the insufficiently high thermodynamic efficiencies of turbines and compressors obtainable with the existing knowledge of aerodynamics.

To those familiar with the problem, it will be apparent that in the thermodynamic expression for the overall thermal efficiency of a gas turbine power plant, the thermodynamic efficiency of the turbine is a very significant and determining factor, more so than the thermodynamic efficiency of the compressor which it drives.

The invention described herewith concerns itself broadly with an airplane power plant in which the thermal efficiency of a gas turbine is improved, both by safely increasing the maximum temperature of combustion gases, and also by increasing the thermodynamic efficiency of the turbo-machine to a point where such a power plant can be efficiently used to drive airplane propellers through a torque converter at varying altitudes.

The attainable thermal efficiencies of gas turbine plants rise rapidly with the increase of the maximum cycle temperature at which the propulsive gases may be used in the blading, so rapidly in fact, that the difference between a maximum cycle temperature of, say 1450° F. and 1200° F., may constitute the difference between a commercially advantageous design and one which is inferior in performance to other types of existing thermal prime movers.

The combustion turbo-plant is very nearly the ideal attainable thermal power plant for aircraft propulsion. Apart from its high thermal efficiency, possibilities of increased power on take-off, and constant power with altitude, it has a range of practical advantages, some of which are even more attractive and desirable than low fuel consumption itself.

Among them are:

1. Vibrationless running.
2. Use of a highly non-inflammable fuel, of the Diesel oil type without requiring special blends thereof.
3. Compactness and simplicity, as compared to reciprocating engines.
4. Lower first cost and low maintenance costs.
5. Very low (practically none) lubricating oil consumption. No external lubricating system is necessary; all lubricating oil is contained in the turbo-plant casing, possibly even using the casing as a surface cooler.
6. Absence of sensitive parts, such as spark plugs (arc or glow ignitors are used instead), magnetos, carburetors, torsional damping couplings, etc.
7. Adaptability of the turbo-plant to serve as a prime mover for the energization of the boundary layer on the wings; i. e., by simple valving of the compressor intake and exit to the wings.
8. Simplicity of control.
9. Relative quietness of running.

The gas turbine type of power plant is best suited for unit outputs larger than 2,000 H. P., and the turbo-plant to be herein described is of the practical minimum limiting size suitable for aircraft propulsion, of 2,000 H. P. The power plant to be described is of the pusher type, but obviously can be adapted for use as a tractor.

*General discussion of a turbo-plant for aircraft use*

The turbo-plant described herein operates according to the well known Ericsson air cycle. When combustion gases take part in the cycle in addition to air, the cycle is generally known as the Brayton cycle. However, the amount of excess air is so large in the case of the turbo-plant herein to be described that it is preferred to call the cycle of this power plant by the name having historical priority in this art, viz., the Ericsson cycle.

The design is based upon the use of Diesel oil fuel, and upon a maximum temperature of the gases, at the first turbine stage, of 1450° F. Although this is a high gas temperature as viewed from steam turbine practice, it is lower than the temperatures obtained in turbo-superchargers of aircraft engines. This temperature will not impose a severe thermal strain on the turbine; and the high temperature section of the turbine is air cooled, and so designed that the temperature decreases rapidly in the first stationary stage.

The turbo-plant can maintain full shaft horsepower output up to at least 18,000 ft. altitude, with a constantly increasing thermal efficiency.

The justification for the statement that the gas turbine has increasing overall thermal efficiency with altitude, lies in the nature of the turbo-plant. Nominally a constant pressure combustion turbo-plant, it also becomes a variable compression ratio power plant with increasing altitude. This is particularly advantageous, because while the compressor operates on an entropy diagram in a region where the isobars are spaced closely together and have a small slope, the turbine operates in a region where the isobars are far apart and have a rapidly increasing slope. The heat drops obtained in the turbine, therefore, increase faster than the heat rises required by the compressor and the efficiency of the turbo-plant increases. The increase of efficiency is somewhat diminished by the larger amount of excess air required at altitude, but in spite of this, the rise of the thermal efficiency with altitude, due to reduction in outer air temperatures, is noticeable and valuable as will be shown later.

The herein described turbo-plant is designed to deliver 2,000 H. P. on the propeller hubs, including all thermal and mechanical losses within the turbo-plant and the transmission. Were it not for the inclusion of the transmission losses, the net power delivered by the turbine would be approximately one-third of the total turbine output. The other two-thirds of the turbine shaft power are required for the propulsion of the compressor.

It can thus be seen that there must exist a certain minimum speed below which the power plant will not deliver external power with a diminishing rate of fuel oil supply. Granting that fuel oil will always be supplied according to the requirements of the load, this critical speed is of the order of 25% of the normal rotating speed. In accordance with the cube law, the power required at this speed is only about 1½% of the normal shaft horsepower. This possible variation indicates an unusual flexibility of the turbo-plant for aircraft purposes.

It should also be noted that the rated shaft horsepower output is a constant performance power, which the power plant is designed to carry on indefinitely. The temperature of the exhaust gases is, at all altitudes, sufficiently high that no moisture can be precipitated within the turbo-plant. All moisture in the exhaust gases escapes as superheated steam. The exhaust gases are non-toxic. Carbon monoxide cannot exist at the exhaust due to the strongly oxidizing combustion within the turbo-plant. In fact the exhaust gases are almost pure air and can be readily used for heating in radiating elements in the airplane cabins.

*Objects of the invention*

The main object of our invention is to provide a novel and complete airplane power plant; to provide an airplane power plant structure including a combustion turbine wherein propulsive gases of high initial temperature may be used; to provide an airplane power plant wherein the high initial temperature of turbine gases may be rapidly reduced in the first turbine stage and thereby limiting the number of stages wherein relatively low creep alloys must be used; to provide an airplane power plant structure wherein such initial stages have high efficiency in converting the heat energy of gases to mechanical energy on the periphery of the turbine in spite of large heat drops that take place in them; to provide a combustion turbine power plant for aircraft use wherein the transfer of heat from the high temperature regions, e. g., combustion chamber and turbine, to the low temperature regions, e. g., the compressor and the external surroundings is minimized; and in such a power plant to provide new and improved ducting of air between centrifugal compressor stages in which the energy changes from dynamic energy to potential energy and vice versa, are entirely eliminated; to provide an airplane power plant wherein a high speed turbine can be used to drive coaxial propellers in opposite directions at efficient speeds; to provide a complete airplane power plant utilizing a gas turbine as a prime mover; to provide an airplane power plant that can maintain full shaft horsepower up to at least 18,000 ft. with constantly increasing thermal efficiency; to provide an airplane power plant capable of being properly streamlined; to provide a complete airplane power plant of the gas combustion type having ducting therein so arranged as to shape the power plant into a form suitable for mounting in an airplane; to provide a unitary aircraft power plant incorporating a combustion turbine and a speed reduction device suitable for driving contra-rotation propellers; to provide an airplane in which the intake of a gas combustion turbine utilized as a prime mover is utilized to increase the aerodynamic efficiency of the sustaining surfaces; and to provide an airplane power plant which exhausts a large mass of gases and is thereby capable of generating a large positive thrust by gas jet reaction, in addition to the propeller thrust.

In the drawings:

Fig. 1 is a longitudinal view, the upper half thereof being primarily in section with the lower half in elevation, of one preferred form of our invention designed to operate two pusher type dual-rotation propellers. This preferred arrangement does not exclude the possibility of using the propellers at the compressor end as tractors.

Fig. 2 is a front view of the device of Fig. 1.

Fig. 3 is a diagram showing speed reduction curves.

Fig. 4 is a sectional view of blade structure.

Fig. 5 is a diagram showing the operating circuit of the torque converter forming a part of the power plant of our invention.

Fig. 6 is a top plan view of an airplane showing a typical installation of the power plant described herein, this airplane design being shown, described and claimed in the design application of John K. Northrup for Airplane, Serial No. D-92,284, filed May 10, 1940.

*Detailed description of the main turbo-plant units*

Referring to Fig. 1 for a detailed description of the main assembly units of the 2,000 H. P. power plant of our invention, an external casing 1 preferably made in two halves and bolted together along the mid-horizontal plane, is provided at one end with an accessory drive gear box 2 in which can be driven such accessories as are required for the proper functioning of the power plant, such as fuel pumps, oil lubricating pumps, scavenging pumps, water jet injection pumps, for take-off use, charging generators for charging an electric storage battery which can be used for ignition purposes as will be explained later, and a starting mechanism. These accessories will vary in accordance with specific designs and need not be separately described.

An adapter shaft 3 is provided in this gear box for the attachment of an external power source for starting purposes if desired, and mounted on the top of the gear box is a throttle control 4 which may be used to control a fuel supply governor, not shown, this governor regulating the supply of oil from the fuel pumps to the burners for speed control, as will be explained later. This casing section also supports opposite main air inlets A.

The next casing section comprises a compressor stator 5 which carries axial stages, preferably twelve, of a turbine type compressor, the rotary blades 6 being carried on the rotor structure 8, with stator blades 7 attached to stator 5. Each blade row carries a free shroud 101 and labyrinth seal flanges 102 entering labyrinth seal channels 103 on the opposite member, rotor or stator as the case may be, shown herein in Fig. 4.

Rotor 8 is hollow and supported at one end on a radial flange 9 engaging compressor and bearing 104, and the other end is supported on a second radial flange 10 which also serves to support a pair of centrifugal impellers 11 and 12. These impellers are cased by an impeller casing 14 having therein a diffuser duct 15 connecting the output of the first impeller 11 with the input of the second impeller 12 without substantial loss of velocity.

The axial compressor stages discharge into the bases of the vanes of the first impeller, the air being given a tangential direction before engaging the vane bases to reduce entrance shock. The compressed air is conducted peripherally from the second impeller through diffuser duct 20 into a burner casing 21, at the far end of which the air is turned first radially and then reflexed axially in channel 22 by corner directing vanes 23, the outer wall 19 of diffuser duct 20 forming the turbine cover.

The combustion chamber is an annular space 24 located inside of duct 20, and separated therefrom by combustion chamber wall 26. In the combustion chamber are equidistantly spaced, preferably six, sets of radial vanes 27, in which are mounted fuel atomizing nozzles 28, each nozzle being supplied by oil by pipe 29 passing through diffuser duct 20 in a streamlined vane 29', from the outside of the casing. These pipes are connected to the fuel pumps through the governor and pilots control above mentioned.

Each one of these vanes 27 is flanked by two larger, profiled vanes 30 positioned at a large angle of attack with respect to the air passing through the fuel nozzle vanes 27. These flanking vanes are equipped with electric resistance igniters 31 and may also be provided with ducting and openings 32 for water injection to facilitate take-off, as will be later explained. The combustion between the flanking vanes is extremely intense, and here temperatures of the order of 3000°–3500° F. are found. The air is moving at a relatively slow speed in the combustion chamber to promote perfect oxidation, and is mixed with air passing between flanking vanes of adjacent burner assemblies. The flanking vanes 30 serve not only as shields against the cooling effects of the excess air, but create violent turbulence within the full volume of the combustion chamber as soon as the hot air mass has reached the ends of the flanking vanes, as has been described and claimed in Dallenbach et al. Patent No. 2,296,023 of Sept. 15, 1942, for Burner. The temperature beyond the flanking vanes is only 1450° F. due to cooling by excess air.

The wall 26 of the combustion chamber is also cooled by small air duucts (not shown), cool air from the diffusion duct 20 being passed through this wall. This small volume of air does not enter directly into the combustion process, but rather acquires its heat by gradual increase in temperature through conduction, and thereby insulates the structural walls of the power plant from the effects of high temperature. This wall may also be provided with spaced polished sheets to minimize radiation.

After exit from the combustion chamber the hot gases are turned radially inward to enter the first stage of the turbine. This stage is radial, and has a rather large diameter in order to obtain a substantial heat drop therein, and comprises the stationary nozzle cascade 40 directing the heated gases against a rotating vane cascade 41. Next, the gases enter at about 1270° F., an axial 100% reaction stage having nozzle partitions 42, working into stator reaction blades 44. Nozzles 42 act as spokes for a rim which also supports the ends of the rotating buckets 41 of the first radial stage. Between the bucket 41 and nozzles 42 the direction of the gases changes from radially inward to axial flow. This change is facilitated by corner vanes 43.

This general type of gas turbine structure has been shown, described in more detail separately, and claimed in application of Pavlecka et al. for Compressor, Ser. No. 413,781, filed Oct. 6, 1941, which is a division of Ser. No. 403,338, now abandoned.

After gases have left the nozzles 42 and first stationary blade 44, they pass through a plurality of, preferably nine, reaction (50%–50%) stages, these stages having constantly increasing diameters. These stages are represented by additional stationary blades 44 mounted on stator 49 forming the inner combustion chamber wall, and cooperating with rotating blades 45, these latter rotating vanes being mounted on a rotor shell 46, one end of which is attached to a flange 47 joining with flange 10, the other end 47' being supported on a hub 48, which, with burner casing 21, forms a second main bearing 50. Blades 44 and 45 are provided with free shrouds and labyrinth seals, as described for the compressor blades.

The gases from the nine reaction stages then are vented by short ducts 51 to the outside, emerging through louvers 52, in exhaust casing portion 53, turning the gases rearwardly.

As the power plant exhausts a large volume of gas, the jet effect thereof is valuable and contributes a substantial amount of positive thrust by gas jet reaction, which of course is additive to the propeller thrust. For this reason the exhaust is directed rearwardly.

It should be noted that in the construction just above described, the second impeller and part of its outlet duct is close to the radial portion of combustion chamber 24. Room is made here for a relatively thick diaphragm D, the main internal space of which may be filled with spaced and polished plates to prevent radiation loss therethrough, and through which air can be bled from diffuser duct 20 and from second impeller 12 around the shrouding thereof.

Air from both of these sources is supplied to pass through the interior of first and second stage turbine blades for cooling purposes, and this air can then be vented into the axial reaction blading, so that its heat will not be lost.

It is also to be noted that the combustion chamber is also insulated from the atmosphere by peripheral diffuser duct 20, so that the heat losses are small.

The turbo-plant can be started by a slow burning powder cartridge, by compressed air either directly or indirectly through a small single stage compressed air turbine, or it can be started by connecting an auxiliary power plant. The turboplant speed is preferably regulated by a controllable constant speed hydraulic governor to prevent it from hunting; the governor controls the fuel supply to the burners through pipes 29 and is connected to the pilot's throttle 4 for his speed setting. Pilot's throttle controls the turbo-plant completely merely by setting the fuel supply rate. A maximum slow-down speed control is preferably provided within the auxiliary drive gear box.

Inasmuch as we prefer that the nominal operating speed of the turbine power plant be from 8,200 to 9,000 R. P. M., this shaft speed should be reduced to a suitable speed for the propellers. We have provided a hydraulic torque converter for this purpose.

Hub 48 is continued through the main bearing 50 to drive a radially discharging centrifugal pump impeller 60, this pump having double inlets 61—61, discharging against a series of reaction turbine blades 62. These turbine blades are attached alternately with opposite attack angles to a pair of parallel wheels 63 and 64, one of these wheels being atached to a rotating housing 65, the other wheel being attached directly to an inner power shaft 66. The rotating housing 65 is connected to an outer power shaft 67 mounted concentrically with the inner shaft, in propeller shaft bearings 68. These two shafts extend rearwardly, the internal shaft 67 carrying the outer propeller 70, and the exterior shaft carrying the inner propeller 71, these propellers preferably being of the "Hamilton standard hydromatic" type, increasing the propeller pitch with increasing altitude and increasing airplane speed to absorb the energy delivered thereto. Each of the propellers is provided with a streamlined housing 72 and 73, respectively, around the hubs thereof, housing 73 being continued as a tapered section 74 around the main bearing 68, and further as a housing 75 around the torque converter, this housing merging coextensive with the exhaust section 53 of the turbine casing. If desired, this exhaust section 53 may then be prolonged as a streamlined nacelle 76 to enclose the turbine, compressor, and accessory gear box of the device.

Housing 75 of the torque converter is used to hold oil for use in the interior of the converter, and the housing exposure to the atmosphere serves to cool this oil; the hydraulic converter being a highly efficient machine, the heat rejection from the oil can be in most cases accomplished in this manner.

Torque converter blades 62 are set at angles so that oil from impeller 61 drives the wheels 63 and 64 in opposite directions, thereby driving the propellers in opposite directions. Blades 62 are preferably of airfoil section, and means are provided to change the angle of attack thereof under control of a governor and of an absolute atmospheric pressre device, to give a varying speed reduction, as brought out in full detail in application of Pavlecka for Hydraulic torque converter, Serial No. 360,707, filed October 11, 1941.

The control arrangement for the reaction blades 62 is shown diagrammatically in Fig. 5, showing one blade only on each wheel. Here the blade 62 is under the control of a piston 110 in one wheel 63, and the other blade 62 is under the control of another piston 111 in the other wheel 64. These pistons operate in closed cylinders 112 and 113 respectively, one end of each cylinder is provided with upper oil ducts 114 and 115 respectively, the other end of each cylinder being provided with lower oil ducts 116 and 117 respectively, these oil ducts running in the wheel supports to oil glands 118 and 119 on opposite sides of the torque converter. These glands are so arranged as to take off the upper and lower oil ducts separately. Oil lines 120 running to the upper oil ducts are connected together, and oil lines 121 running to the lower oil ducts are connected together, so that differential pressure in these oil ducts from main oil lines 122 and 123 thus formed, will move the pistons and thereby change the angle of attack of the blades 62. Main oil lines 122 and 123 are supplied with oil from a governor 127 driven by outer shaft 67, this governor having a sleeve 129, attached to a barometric capsule 130, the sleeve being moved to change the position of the oil ports in the governor in accordance with absolute atmospheric pressure, under control of dash pot 133.

The governor is supplied with oil from oil pump 131 taking oil from torque converter housing 75 and driven from turbine shaft 48. A portion of the oil from this pump is led inside the rotating housing 65 along the turbine shaft 48 to keep this housing full at all times, excess oil draining back into the torque converter housing 75 through external holes 132 in rotating housing 65. By thus passing oil through the torque converter while it is operating, cool oil can be supplied to the interior of the device and oil which has absorbed heat during the operation of this device is passed into the external housing 75 for cooling. Thus, there is a continual circulation through the converter, in addition to the circulation within the converter.

The propeller speeds therefore will be set in accordance with the governor action as modified by altitude, and the pilot's control.

Materials

The difficulties attendant upon high temperature of the propulsive gases manifest themselves in various ways. One of the most important of these is the "creep" and plastic relaxation or gradual deformation of material under stress. The rate of creep varies with the stress and also with the temperature. The variation with stress is approximately linear, but the variation with temperature is exponential, i. e., the rate of creep increases in geometric ratio while the temperature is increasing in arithmetic ratio. This phenomenon constitutes one of the greatest obstacles to the use of high temperature thermodynamic cycles in gas turbine plants. If the turbine blading or its supporting structure creeps, there will eventually come a time when the clearances between the rotor and stator disappear, and replacement of these parts is necessary. Therefore, if the turbine be designed with small clearances and very low stage leakage for initially high thermodynamic efficiency, and the temperature of the gases in the first stages of the turbine also be high for the same purpose, it is quite possible that the creep rate will be so high that replacement of the turbine components will be necessary in a relatively short time, and that savings due to high thermal efficiency will be more than offset by large rebuilding costs.

The maximum temperature of 1450° F. used in our turbine would be, in an industrial power plant, a high temperature indeed. In an aircraft turbo-plant, which can be overhauled after every 300 to 500 hours, the creep rates of heat resistant American alloys, such as "K–42–B," or ATV–S, used for the first turbine stages, do not present an insurmountable obstacle. Therefore, temperatures of the order of 1450° F. can be considered as reasonable for aircraft application. Furthermore, as elsewhere described, nowhere do the maximum temperature gases come in direct contact with rotating parts due to excess air admixture shielding, and to the use of the first stationary expansion nozzles 40. The impinging gases are already cooled to 1270° F. before reaching the first rotating stage.

The problem thus briefly set forth is complicated by an additional factor, e. g., the vibration damping properties of the metals used for the construction of the turbine blading. The turbine blades exposed to high temperature gases should be made of special heat resisting, non-oxidizing alloys which possess very low creep rates such as "K–42–B" or ATV–S. An important disadvantage of these alloys is their low internal cohesive friction at high temperatures, physically defined as low damping coefficient. Parts of turbines made of these materials, e. g., bladings, are easily excited into violent vibrations even outside the region of resonance with the exciting forces, and may develop fractures. Our turbine structure using these alloys is designed with this condition in mind, viz., to restrain the blades against dangerous vibrations without detrimentally affecting the performance of the turbine as an aerodynamic machine. The tops of all blades are tied together by rigid sealing rings which encastre the free ends of the blades, and thus the resonant frequency response is greatly reduced.

The principal martensitic material used may be SAE4340 or SAEX4340, chrome-nickel-molybdenum steel. This alloy is preferred for the rotor of the axial compressor and for the low temperature exhaust portion of the turbine rotor. The turbine stator is fabricated from stainless steel of a Cr–Ni–Mo analysis, as is the diffuser duct to the combustion chamber.

The stator of the axial compressor can best be made of a magnesium alloy casting, and the majority of the axial compressor turbine blades cut from a high strength aluminum alloy.

The rotors of the centrifugal compressors are designed of fully machined steel parts, mutually slotted and fused into one unit preferably by hydrogen-copper brazing. By this method of construction clean ducting and exactly dimensioned channels are achieved, without resorting to drilling of the discs and riveting of the vanes.

The housing which contains the diffusers and return channels for the centrifugal compressors is made in the same manner as the rotors.

Having finished the description of our power plant, we now wish to discuss the operation of the device in detail. We will, therefore, first turn to a discussion of the compressor.

The compressor

The compressor has been shown to consist of two sections; the low pressure axial staging, and two high pressure centrifugal stages. This arrangement is advantageous because the bulkiness of low pressure centrifugal compressors is avoided. In the high pressure end of the compressor the centrifugal impellers are more advantageous because they give a large pressure rise and are short in length as compared to axial staging.

The axial compressor has all stages sealed by labyrinth seals against leakage, and all blading on the stator as well as on the rotor, is designed preferably with modern laminar flow profiles. The properties of these profiles can be exactly calculated and the profiled blades can also be made very accurately.

The entries of the centrifugal compressors have warped vanes for gradual acceleration of the incoming air into the rotors; this design diminishes entry shocks and is conducive to high efficiency, the air entering the impeller blades at the best design angle for the rated power.

The combustion chamber

The combustion chamber is equipped with turbulence inducing vanes already mentioned elsewhere in the course of this description. The combustion process is greatly accelerated by the pressure of the incoming air and also by the large amount of excess air used for cooling after combustion. It is known that combustion under pressure is extremely rapid, as for instance in Diesel engines. With large amounts of excess air the fuel oxidation has the nature of an intense glow at 3,500° F. maximum in the combustion space; the turbulent mixing of the burned gases with fresh air is accomplished progressively in a short distance. A large heat drop is provided in the first turbine stage 40 and 41, and any volumetric inequality of temperature distribution is reduced, if not completely done away with, by the large stage expansion and cooling in the first stationary nozzle ring 40.

It has been stated that water can be injected into the combustion chamber for purposes of increasing the power during take-off periods. As an example of this action, if twice the normal amount of fuel be injected for combustion during take-off, the fuel will still be completely burned, since there is ample air present. Normal combustion as described takes place with approximately six times the minimum air required at rated power delivery. Thus, the excess air with double the fuel is still approximately 3:1. There will be an increase in heat and an increase in the weight of gases after the oil has been consumed, although this latter increase is small. The excess heat produced by the combustion of the excess fuel has to be absorbed if turbine cycle conditions are to be maintained with the maximum temperature kept at 1,450° F. The desired temperature is maintained by injecting a certain amount of water into the burning gases and the excess heat heats the water to its boiling point, vaporizes it, and superheats the steam to 1,450° F. There will be an increase in power and in speed of the turbine, and the increase in power can be calculated to be approximately 94% when the fuel supply is doubled and the right amount of water supplied to reduce the gases entering the turbine stages to 1,450° F.

Summarizing then, one of our methods of increasing the power for take-off is to increase the amount of fuel injection, and at the same time to inject water to prevent overheating of the turbine. The discussion given above is based on doubling the fuel supply and substantially doubling the turbine power for a short time to facilitate take-off. However, it is not contemplated that such a large amount of excess power will be required for take-off, or that the propellers need to be designed to absorb a 94% increase in power. The amount of extra power needed for the take-off can be controlled by coordinating the fuel increase with water supplied, and can be kept within values to be absorbed by propellers now in use and well known in the art.

Another method of increasing power for take-off and also for temporary boost while flying is to increase the amount of the rate of fuel injection into the combustion chamber and thereby increase the resultant temperature of the gases. By increasing the temperature of the gases from the rated 1,450° F. to 1,600° F., which still can be sustained by our materials and structural design of the machine for short periods of time, the shaft power can be increased by 50% of the normal rated power.

The turbine

The premise that no rotating part shall be exposed to high temperatures leads to the described design of the first stage as a large diameter radial impulse turbine. The nozzles and buckets of this stage are designed to be short, therefore rigid and compact and thereby able to withstand, particularly in the stator nozzles 40, considerable temperature differences of a local character.

The expansion in the first stationary ring of nozzles is 100° F. including reheat, so that the gases are leaving the rotor buckets 41 at a temperature of 1,270° F. With the internal air cooling of blades 40 and 41, which is functioning automatically the moment the power plant gets under way, the second stage entry temperature of 1,270° F. is not considered excessive.

The design of the two high temperature stages of the turbine is novel in that it combines a radial and an axial impulse turbine into a common unit. Although the rotary portion of the second stage is an impulse wheel in principle, it actually operates as a 100% reaction turbine, because the nozzles 42 rotate and the first stator blades 44 are stationary.

After the first two turbine stages follow nine reaction (50% reaction) stages, which expand the gases in small heat drops per stage down to the exhaust pressure. The design of the turbine yields one of the highest Parsons' numbers that can be achieved by a practical design.

All the turbine stages are sealed against leakage by labyrinth seals and consequent disturbances in the streaming of gases which normally so disturb the uniformity of flow are substantially absent. Joukowsky sections are used for the reaction turbine blading because of the greater accuracy of analysis and fabrication of a profile which can be generated geometrically. In addition, the shape of the Joukowsky profiles is favorable to withstand high bending moments and has a high resonant frequency. Also the maximum profile thickness of the Joukowsky sections is at the point of the maximum lift load.

The cooling of the turbine is important. However, only the first two or three stages at the most are in need of cooling. It is realized that the problem resolves itself into two separate methods of protection against high temperatures. One method, already discussed above, does not cool in the proper sense of the word, but rather structurally shields essential parts from excessive gas temperatures by a layer of relatively cool air coming from the diffuser duct 20. This layer of air is in motion and picks up heat on its way through the combustion chamber wall 20, until it will emerge at approximately the same temperature as the gases. The air serves as a heat insulating medium only, cooling is negligible. This method is practiced in the walls of the present turbine design wherever it is feasible.

On the other hand, there is a definite need of cooling in the rotating bucket wheels 42 of the first impulse stage. Here the buckets are bored out hollow and provided with a simple expanding orifice inside the bucket to a by-pass around diaphragm D from the second impeller 16. The rotating hollow buckets 41 are, therefore, not only light in weight, but the air volume ducted to them from the last centrifugal stage expands in them and cools them by air expansion. The cooling and insulating air is not lost to the cycle. This air acquires heat while cooling the turbine and releases its energy later on when vented into the reaction stages.

The turbo-plant is designed to be light in weight, and its component parts have only a low heat content capacity. This provides a turbine which does not distort non-uniformly while starting or during cooling. In addition, a special precaution has been taken to mount the stationary blade rings of the turbine in a stator uniformly deformable in a radial direction, and to mount all of them on peripheral springs, not shown. This method of assembly is desirable because this turbine is equipped with stage sealing and it is important to keep the inner diameters of the stationary rings circular under all conditions. Longitudinally the stationary rings are also assembled with a preloaded force from a circular spring at the exhaust end, these minor constructions being more fully shown and described in the Pavlecka application for Turbine stator, Ser. No. 385,105, filed Mar. 25, 1941.

With these precautions against heat distortion, and due to the inherently light weight nature of an aircraft turbo-plant, no difficulty is experienced in service with heat distortion.

The torque converter

As mentioned above, the turbo-plant is a high speed device with normal rotation range of from, for example, 8,200 to 9,000 R. P. M. It has the characteristic of providing constant horsepower output with varying altitudes; but in order to maintain the constant output, the speed must be permitted to increase with altitude, so that while the turbine shaft 48 may operate at 8,200 R. P. M. at sea level, at 18,000 ft. altitude this speed will increase to 9,000 R. P. M. On the other hand the contra-rotational propellers 70 and 71 utilized in the power plant, in order to dissipate the same amount of power at maximum efficiency, should make perhaps 2,000 R. P. M. at sea level, and their rotational speed should decrease to about 1,200 R. P. M. at 18,000 ft. altitude with the propellers automatically increasing in pitch to absorb the power. The ratio between the turbine shaft and the propeller shaft speeds, therefore, should vary with altitude in accordance with a complex curve starting at 4.05:1 ratio at sea level and ending 7.5:1 at the maximum altitude for which the turbo-plant is designed. These relationships are shown in the graph of Fig. 3, and form the basis of the specific design of torque converter herein discussed.

Modern air propellers are designed for tip velocities approaching the velocity of sound in atmospheric air. The velocity of sound in a gas is determined by the relation:

$$V = \sqrt{gKRT}$$

where:

$V$ = velocity of sound, ft./sec.,
$K$ = ratio of specific heats,
$g$ = gravitational acceleration, ft./sec.$^2$,
$R$ = gas constant, 53.34 for air,
$T$ = absolute temperature, °Kelvin.

From this relation can be determined the effect of altitude on the velocity of sound. The ratio of specific heats, $K$, does not change enough to influence the velocity of sound. This holds true also for the gravitational acceleration $g$; but the absolute temperature of the atmosphere, $T$, does change with altitude, decreasing as the altitude increases. Therefore, the velocity of sound decreases with altitude directly as the square root of the absolute temperature of the atmosphere.

Airplane propellers are designed to operate within approximately 25% of their radius from the tip, at velocities very close to the velocity of sound at sea level atmospheric condition. With increasing altitude the propeller tips reach the velocity of sound even at constant propeller speed, because the velocity of sound is lower than at sea level. The airflow around the propeller tip profile becomes erratic, irregular and ceases to contribute to useful energy conversion into thrust as soon as the peripheral velocity of the tip has approached the velocity of sound in the ambient atmosphere. The losses due to these phenomena diminish the efficiency of the propeller and high propeller tip velocities, are, therefore undesirable and every effort is made to avoid them. These losses can be avoided by reducing the speed of the driving motors, but this is not desirable because the power is also reduced, due to the nature of combustion engines. Attempts have, therefore, been made in the aircraft industry to develop speed change transmissions, which will vary the speed of the propeller inversely with increasing altitude, while the speed of the motor remains substantially constant. So far as known, all these designs attempt to vary the speed of the propeller shaft in steps, because it is undeniably difficult to vary this speed according to a continuous, although not necessarily constant, rate. In brief, these transmissions propose to accomplish a reduction of the propeller rotational speed, while the rotational speed of the prime mover remains constant. While the rotational speed of the propeller is being diminished, the pitch of the propeller is increasing by automatic regulation and the propeller is at all times able to absorb the energy of the motor. This also fits well with the known fact that the speed of airplanes (when power remains constant) can increase with altitude. Realization of this advantage depends upon the increase of the propeller pitch with increasing altitude and increasing speed.

The hydraulic converter used in our power plant makes possible a continuously variable rotational speed of the propeller shaft while the rotational speed of the prime mover changes in the opposite direction to the change of the rotational speed of the propeller.

The rotational speed of our gas turbine increases with increasing altitude, and the propeller speed change apparatus is therefore called upon to convert an increasing rotational speed to decreasing rotational speed. The hydraulic converter accomplishes precisely this function.

It has been pointed out above that the impeller 60 of the torque converter discharges oil past two sets of reaction blades 62, alternate reaction blades being attached to wheels 63 and 64 respectively, which in turn drive the contra-rotating propellers. It is therefore obvious if the angles of attack of the vanes 62 are changed, that speed reduction is changed. The angles of attack may be changed automatically by governor 127 equipped with a small dash pot 133. The amount of energy required to accomplish adjustment of the angle of attack is small, since the reaction forces on the blades are but slightly unbalanced and there is therefore no observable difference from the seped of action of a governor in increasing or decreasing the angle of attack of the blades. The governor is attached to outer shaft 67, to cause the speed of the converter to hunt above and below the normal speed setting, as is desirable to secure sensitive speed control, but the damping is adequate so that the hunting occurs very gradually and through a very narrow speed range.

The normal speed maintained by the governor is also placed under the control of an aneroid capsule, which may take any of the forms suitable for the purpose. By linking the barometric control and the governor, and using the combined control to vary the angles of attack of the blades 62, the controls can be set to meet the conditions as determined by the curves of Fig. 3.

Curve 90 shows the variation of the turbine shaft speed with altitude for constant power output. Curve 91 shows the variation of the propeller shaft speeds (in opposite directions) with altitude for best efficiency, the propeller pitch being assumed to be automatically adjusted to proper relation to the air density at the particular altitude in which the plane is operating. Barometric control is so set as to give a speed ratio varying substantially as shown by the resultant curve 92, as the altitude varies.

Attention is drawn to the fact that we have described only the outer of the output shafts as used for governing the device, although it is quite possible to use a governor on each shaft to control the attack angles of the two sets of wheel blades independently. The use of a single control, however, is justified by the fact that action and reaction as between the various alternate blades are equal and opposite, and as a result the torques on the two shafts are necessarily equal. For this reason it is even possible to make the blades adjustable on only one of the two turbine wheels of the converter, although this will result in some loss of efficiency, and the use of a single set of adjustable blades is not therefore recommended. Its possibility does indicate, however, that errors arising from the use of a single governor are too slight to warrant the additional weight and expense which would be involved in the use of a dual governor.

Another point which should be brought out is the fact that the torque converter herein described is not reversible, i. e., if either of the propeller shafts be rotated by an external source of power, such as the connected propeller, when gliding, there is little tendency to rotate the turbine shaft. The device therefore acts in a sense, as an overruning clutch, or free-wheeling device which up to a certain limit permits the propeller to run at a greater speed than that called for by the turbine speed. About this limit, the turbine begins to act as an effective hydraulic brake for the propellers and will not allow them to overspeed dangerously. In dives, power is not consumed in turning the prime mover faster than it would be driven by the fuel fed to it, nor is there any danger of speeding up the prime mover excessively.

In case of the loss of load by one of the propeller shafts, as for example, by the loss of one of the two contra-rotating propellers 70 or 71, the unloaded shaft will speed up greatly. However, the load is not wholly removed from the other shaft under these circumstances, and one of the advantages of the device is that a portion of the power still remains available for driving the other propeller, which permits manoeuvring in an emergency landing.

*Turbine performance*

At sea level the compressor raises the air pressure to about 8½ atmospheres absolute. With the air in this condition combustion at 3,500° F. begins, decreasing the combustion temperature to 1,450° F., with the use of about 6 times the minimum required weight of air, as a cooling medium.

Neglecting heat losses, which are extremely small, and the small amount of power required for the drive of accessories, the overall thermal efficiency is 30% at sea level. In terms of Diesel oil fuel of 18,835 B. t. u./pound calorific value, the specific fuel consumption is .446 lb. per H. P. per hour. This compares very favorably with the best specific fuel rates of gasoline engines, using expensive high octane fuels. Diesel oil is preferred over furnace oils because of its higher hydrogen content.

By stimulating the oil supply rate, and at the same time injecting water into the burning gases, take-off power up to twice the rated shaft horsepower can be obtained without using excessive weights of water. This water is rapidly consumed during the take-off period and therefore adds no substantial weight in flight. Such excess take-off power offers extremely important advantages, and the capacity of turbines to withstand sustained overloads is well known.

At high altitude (18,000 ft.) the turbine will still deliver sea level power by increasing the rotational speed 1.07 times, and this power will be properly delivered to the air by action of the torque converter and the automatic feathering of the contra-rotation propellers.

By expanding the gases down to .55 atmospheres absolute, leaving .034 atmosphere absolute super pressure for ducting out gases, the overall thermal efficiency at 18,000 ft. is 35%. This compares extremely favorably with the present gasoline engines which, if not turbosupercharged, as is well known, drop their overall thermal efficiency down to 16% to 18% at the equivalent altitude. The reason for the increase of efficiency of the gas turbine with altitude lies in the fact that the intake air temperature is very much lower at 18,000 ft. than at sea level, yet the maximum cycle temperature can remain the same. This increases the available heat drop in the turbine faster than the necessary heat rise in the compressor, and the efficiency is therefore greater with altitude. Turbo-machines are able to adjust themselves to this condition by change of the rotational speed, whereas piston displacement engines do not have this speed versatility, due to valving and porting limitations.

*Installation*

The airplane power plant as above described can be installed in an airplane either as a single unit as shown in Fig. 6 of the present application, or in any desired multiple installation. In either event it is desirable to take advantage of the large amount of air entering the compressor intakes A to remove air from the boundary layer over the upper wing surface. This removal of the boundary layer effectively increases the stalling angle of the wing by suppressing the tendency of the boundary layer to build up in depth and separate from the surface of the wing in a turbulent wake at high angles of attack. The result is an appreciable gain in the maximum coefficient of lift of the wing, with corresponding reduction in the landing speed of the airplane.

Referring then to Fig. 6, it will be seen that the plane shown is an all-wing airplane 200, this airplane having a triangular plan-form with the main-wing sections 201 and 202 set at a slight positive dihedral. The wing sections 201 and 202 have turned down wing tips 203 and 204 disposed at a preferred angle of from between 30°–60° to the pitch axis, so that control surfaces 205 and 206 mounted thereon can preferably be utilized for control of the craft in both roll and yaw. Elevators 207 are provided along the trailing edge of the wing, and a nacelle 208 is provided to accommodate the pilot and navigating personnel of the airplane. The contra-rotation propellers 70 and 71 together with their streamline housings 72 and 73 extend beyond the trailing edge of the wing, and the turbine proper is completely enclosed within the nacelle 208.

The air intakes A are connected, on each side of the nacelle 208 to intake slots 210 in the upper surface of the wing, in the rearward half of this upper surface. The intake slots of the turbine are located at approximately the point where the boundary layer starts to build up at the beginning of a stall, and by the removal of this boundary air the lift of the wing is improved and the stall is delayed. High angles of attack are therefore possible.

We prefer that the slots be narrow and double on each wing, the slots being formed at the edges of covers 211 extending over (with airfoil profiles) wing ducts A' connected to main air in takes A of the compressor. This arrangement spaces the slots, with the rear slot on each wing section adjacent the hinge line of elevators 207.

We have found that for most efficient aerodynamic action in reducing stall, the slots 210 should be positioned in the wing sections between 50% and 70% of the chord length back of the leading edge of the wing sections.

The air taken in from the top surface of the wings is then utilized in the compressor of the power plant, and is vented to the exhaust through the exhaust louvers 52 on the upper and lower surfaces of the plane. These exhaust gases contribute by their reaction jet effect to useful thrust.

Thus, the power plant we have described, due to the large amount of air utilized therein, is installed to have material and beneficial effect upon the action of the aerodynamic surfaces of the airplane in which it is mounted, in that the compressor air can be taken from the boundary layer without decreasing the efficiency of the wing at low angles of attack as does the slotted wing, which, though it increases the maximum lift, also increases drag and actually reduces the lift at moderate angles of attack. The arrangement just above described does not increase drag, and any change in lift produced by it is favorable. Inasmuch as the turbo-plant uses this air completely, no additional power is required by thus increasing the aerodynamic efficiency of the airplane.

It is obvious that in case twin turbo-plants are utilized, the air intakes thereof may be utilized in the above manner to increase the lift on the wings of the craft in which they are installed. Ordinarily, the air need only be taken through slots 210 during take-off and landing. Consequently, we have provided leading edge intake ducts 150 and 150' under control of gates 151 and 151' so that intake air may be taken from the leading edge or from slots 210, as desired.

It should also be pointed out that all of the accessories driven by gear box 2 that are required to operate the power plant are, when the power plant is installed as shown in Fig. 6, completely within the nacelle and in a position where they can be reached by the operating personnel in flight. This is a great advantage because minor adjustments which ordinarily could not be made in inaccessible portions of most prior power plants, can be made while the present power plant is in flight, and the proper operation of all the accessories can be at all times directly checked.

We claim:

1. In combination, an aircraft power plant comprising a central rotor surrounded by a stator, cooperating air compressor members mounted adjacent one end of said rotor and said stator to provide a flow of compressed air in said stator, a fuel burner mounted in said stator in the path of said air, cooperating turbine elements on said rotor and stator driven by the gases of combustion from said burner, an impeller on the other end of said rotor, a source of liquid for said impeller, a pair of concentric propeller shafts mounted coaxially with said rotor and each having rotating blades connected thereto mounted to move in opposite directions under impact of the liquid from said impeller, and automatic pitch controlling contra-rotation propellers mounted on said propeller shafts.

2. Apparatus in accordance with claim 1 wherein means are provided to change the angle of attack of said blades during rotation thereof.

3. Apparatus in accordance with claim 1 wherein means are provided to return said liquid to said impeller after passing through said blades.

4. Apparatus in accordance with claim 1 wherein means are provided to change the angle of attack of said blades during rotation thereof in accordance with the speed of rotation of one of said propeller shafts and also in accordance with absolute atmospheric pressure.

5. Apparatus in accordance with claim 1 wherein the angles of attack of said blades is such as to provide a speed reduction of approximately 4:1 at sea level.

6. Apparatus in accordance with claim 1 wherein the angles of attack of said blades are such as to provide a speed reduction of 4:1 at sea level and wherein means are provided to change said angle of attack to provide a continuously increasing speed reduction ratio with increasing altitude.

7. Apparatus in accordance with claim 1 wherein said compressor members are shaped to provide an output pressure on the order of about 8½ atmospheres absolute and wherein excess air is supplied to said burner to reduce combustion gases to substantially 1,450° F. and wherein said turbine elements are shaped to exhaust said gases at substantially .5 atmospheres absolute.

8. Apparatus in accordance with claim 1 wherein the air from said cooperating compressor elements is ducted through said stator in a reflexed duct, with said burners surrounded by the outer portion of said duct, and wherein said turbine elements comprise a radial stage as the initial stage, and an axial stage as the second stage, both positioned adjacent the discharge of said cooperating compressor elements and followed by a plurality of axial turbine reaction stages exhausting with increasing diameter to the outside of said stator.

9. Apparatus in accordance with claim 1 wherein the air from said cooperating compressor elements is ducted through said stator in a reflexed duct, with said burner surrounded by the outer portion of said duct, and wherein said turbine elements comprise a radial stage as the initial stage, and an axial rotating stage as the second stage, both positioned adjacent the discharge of said cooperating compressor elements and followed by a plurality of axial turbine reaction stages exhausting with increasing diameter to the outside of said stator and wherein means are provided to insulate the discharge of said cooperating compressor elements from the heat of the adjacent burning gases, approaching and passing through said initial and second stages.

VLADIMIR H. PAVLECKA.
JOHN K. NORTHROP.